US010247305B2

(12) United States Patent
Sasahara et al.

(10) Patent No.: US 10,247,305 B2
(45) Date of Patent: Apr. 2, 2019

(54) AUTOMATIC TRANSMISSION

(71) Applicant: MAZDA MOTOR CORPORATION, Hiroshima (JP)

(72) Inventors: Manabu Sasahara, Hiroshima (JP); Yuki Tsuchitori, Hiroshima (JP); Koshiro Saji, Tokai (JP); Tadashi Saito, Hiroshima (JP); Tomotaka Ishizaka, Hiroshima (JP); Tatsuhiko Iwasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 37 days.

(21) Appl. No.: 15/438,421

(22) Filed: Feb. 21, 2017

(65) Prior Publication Data
US 2017/0241546 A1    Aug. 24, 2017

(30) Foreign Application Priority Data

Feb. 23, 2016    (JP) ................................ 2016-032042

(51) Int. Cl.
*F16H 63/30*    (2006.01)
*F16D 25/0638*  (2006.01)
(Continued)

(52) U.S. Cl.
CPC ......... *F16H 63/3026* (2013.01); *F16D 13/52* (2013.01); *F16D 25/0638* (2013.01);
(Continued)

(58) Field of Classification Search
None
See application file for complete search history.

(56) References Cited

U.S. PATENT DOCUMENTS

| 5,234,087 A |   | 8/1993 | Jurgens et al. |
| 6,708,808 B1 | * | 3/2004 | Andres ............... F16D 25/0638 |
|              |   |        | 188/71.5 |

(Continued)

FOREIGN PATENT DOCUMENTS

| CN | 1485557 A   | 3/2004 |
| CN | 102465977 A | 5/2012 |

(Continued)

OTHER PUBLICATIONS

An Office Action; "Notification of Reasons for Refusal," mailed by the Japanese Patent Office dated Feb. 27, 2018, which corresponds to Japanese Patent Application No. 2016-032042 and is related to U.S. Appl. No. 15/438,421; with its English translation.

(Continued)

*Primary Examiner* — Mark A Manley
(74) *Attorney, Agent, or Firm* — Studebaker & Brackett PC

(57) ABSTRACT

Provided is an automatic transmission including: an input section to which power generated by a drive source is input; an output section configured to output a drive force; and a gear shifting mechanism configured to change a gear ratio. The power is input to the input section without intervention of a hydraulic power transmission device. The gear shifting mechanism includes a predetermined frictional engagement element for achieving a starting gear ratio of a vehicle. The frictional engagement element includes: a plurality of friction plates arranged with clearances therebetween; a piston movable between a releasing position where the friction plates are brought into a released state, and an engaging position where the friction plates are brought into an engaged state by pressing the friction plates; and an urging mechanism configured to urge the piston so that the piston (Continued)

abuts against the friction plates and the clearances are reduced.

22 Claims, 12 Drawing Sheets

(51) Int. Cl.
*F16D 13/52* (2006.01)
*F16H 3/44* (2006.01)
*F16D 25/10* (2006.01)
*F16H 3/66* (2006.01)

(52) U.S. Cl.
CPC ............... *F16D 25/10* (2013.01); *F16H 3/66* (2013.01); *F16H 2003/442* (2013.01); *F16H 2063/303* (2013.01); *F16H 2200/006* (2013.01); *F16H 2200/2012* (2013.01); *F16H 2200/2043* (2013.01)

(56) References Cited

U.S. PATENT DOCUMENTS

| | | |
|---|---|---|
| 2004/0055844 A1 | 3/2004 | Ebenhoch et al. |
| 2006/0249346 A1 | 11/2006 | Ebenhoch et al. |
| 2012/0103751 A1 | 5/2012 | Ikeda et al. |
| 2012/0165146 A1* | 6/2012 | Samie ................. F16D 25/0638 475/5 |
| 2013/0030624 A1 | 1/2013 | Suyama et al. |
| 2013/0068580 A1 | 3/2013 | Doegel et al. |
| 2013/0072338 A1 | 3/2013 | Doegel et al. |
| 2013/0072346 A1 | 3/2013 | Doegel et al. |
| 2013/0085030 A1 | 4/2013 | Doegel et al. |
| 2013/0113308 A1 | 5/2013 | Doegel |
| 2013/0203541 A1 | 8/2013 | Lorenz et al. |
| 2013/0267373 A1* | 10/2013 | Mellet ....................... F16H 3/62 475/278 |
| 2015/0083545 A1 | 3/2015 | Wiedmann et al. |
| 2015/0141189 A1 | 5/2015 | Nakano et al. |
| 2015/0276045 A1 | 10/2015 | Sasaki et al. |
| 2015/0362066 A1 | 12/2015 | Kito et al. |
| 2016/0221579 A1 | 8/2016 | Sasahara |
| 2017/0184160 A1 | 6/2017 | Yamamoto et al. |

FOREIGN PATENT DOCUMENTS

| | | |
|---|---|---|
| CN | 102918303 A | 2/2013 |
| CN | 104204584 A | 12/2014 |
| CN | 104334904 A | 2/2015 |
| CN | 104718393 A | 6/2015 |
| DE | 3031174 A1 | 3/1981 |
| DE | 3444103 A1 | 6/1986 |
| DE | 4041159 A1 | 7/1992 |
| GB | 2058275 A | 4/1981 |
| JP | S60-086631 U | 6/1985 |
| JP | 2006-009973 A | 1/2006 |
| JP | 2006-312956 A | 11/2006 |
| JP | 2011-179561 A | 9/2011 |
| JP | 2011-183870 A | 9/2011 |
| JP | 2013-067265 A | 4/2013 |
| JP | 2013-136277 A | 7/2013 |
| JP | 2014-081048 A | 5/2014 |
| JP | 2015-206390 A | 11/2015 |
| JP | 2016-011735 A | 1/2016 |
| JP | 2016-017528 A | 2/2016 |
| JP | 2016-020710 A | 2/2016 |
| WO | 2014/157690 A1 | 10/2014 |

OTHER PUBLICATIONS

An Office Action mailed by the German Patent and Trademark Office dated Nov. 13, 2018, which corresponds to German Patent Application No. 102017001418.3 and is related to U.S. Appl. No. 15/438,421.

An Office Action mailed by the Japanese Patent Office dated Sep. 25, 2018, which corresponds to Japanese Patent Application No. 2016-032042 and is related to U.S. Appl. No. 15/438,421.

An Office Action mailed by the State Intellectual Property Office of the People's Republic of China dated Oct. 31, 2018, which corresponds to Chinese Patent Application No. 201710083149.4 and is related to U.S. Appl. No. 15/438,421.

An Office Action mailed by the State Intellectual Property Office of the People's Republic of China dated Nov. 12, 2018, which corresponds to Chinese Patent Application No. 201710083150.7 and is related to U.S. Appl. No. 15/438,421.

* cited by examiner

FIG.2

|  | CL1(31) | CL2(32) | CL3(33) | BR1(21) | BR2(22) |
|---|---|---|---|---|---|
| FIRST GEAR | O |  |  | O | O |
| SECOND GEAR |  | O |  | O | O |
| THIRD GEAR | O | O |  |  | O |
| FOURTH GEAR |  | O | O |  | O |
| FIFTH GEAR | O |  | O |  | O |
| SIXTH GEAR | O | O | O |  |  |
| SEVENTH GEAR | O |  | O | O |  |
| EIGHTH GEAR |  | O | O | O |  |
| REVERSE GEAR |  |  | O | O | O |

FIG.11

| STATE | CL1 | BR1 | BR2 | |
| --- | --- | --- | --- | --- |
| | | | ENGAGING HYDRAULIC PRESSURE CHAMBER | RELEASING HYDRAULIC PRESSURE CHAMBER |
| STOP | OFF | OFF | OFF | ON |
| STARTING PREPARATION (ZERO-TOUCH STATE) | ON | ON | OFF | OFF |
| START | ON | ON | ON | OFF | ively engaged depending on an operation state of an engine so that gears are automatically shifted to predetermined gear positions. The frictional engagement element includes a plurality of friction plates arranged with clearances therebetween, and a piston configured to press the friction plates. The piston moves between an engaging position where the friction plates are brought into an engaged state by pressing the friction plates, and a releasing position where the friction plates are brought into a released state by releasing the pressing.

AUTOMATIC TRANSMISSION

TECHNICAL FIELD

The present invention relates to an automatic transmission including frictional engagement elements.

BACKGROUND ART

Automatic transmissions to be mounted on vehicles such as automobiles include planetary gear sets and a plurality of frictional engagement elements such as multiplate clutches and multiplate brakes. The plurality of frictional engagement elements are select The frictional engagement element is required to perform engagement with a quick response. Japanese Unexamined Patent Publication No. 2014-081048 discloses an automatic transmission including clearance adjusting pistons configured to reduce the clearances of the friction plates. By reducing the clearances in advance, the engagement response of the friction plates when an engaging hydraulic pressure is supplied can be made satisfactory.

In the transmission of Japanese Unexamined Patent Publication No. 2014-081048, however, a problem arises in that positional control of the clearance adjusting pistons with a hydraulic pressure is difficult. Specifically, when the pistons receive a hydraulic pressure, the pistons are deformed, which makes it difficult to perform positional control of the pistons in an engaging direction so as to reduce the clearances of the friction plates accurately. In this case, a trouble of an increase in engine resistance occurs if the transmission is an automatic transmission having a configuration in which power of a drive source is applied to an input section without intervention of a hydraulic power transmission device (torque converter).

SUMMARY OF INVENTION

It is an object of the present invention to provide an automatic transmission in which power of a drive source is applied to an input section without intervention of a hydraulic power transmission device, and in which frictional engagement elements can be engaged with a quick response without increasing the engine resistance.

An automatic transmission according to one aspect of the present invention for achieving this object is an automatic transmission for a vehicle, including:
an input section to which power generated by a drive source is input;
an output section configured to output a drive force; and
a gear shifting mechanism configured to change a gear ratio between the input section and the output section,
the power being input to the input section without intervention of a hydraulic power transmission device,
the gear shifting mechanism including a predetermined frictional engagement element for achieving a starting gear ratio of the vehicle, and the predetermined frictional engagement element including:
a plurality of friction plates arranged with clearances therebetween;
a piston movable between a releasing position where the friction plates are brought into a released state, and an engaging position where the friction plates are brought into an engaged state by pressing the friction plates; and
urging mechanism for urging the piston so that the piston abuts against the friction plates and the clearances are reduced.

BRIEF DESCRIPTION OF DRAWINGS

FIG. 2 is an engagement table of frictional engagement elements provided to the automatic transmission;
FIG. 11 is a diagram in the form of a table showing how hydraulic pressures are supplied to the frictional engagement elements when a vehicle is started from a stopped state.

DESCRIPTION OF EMBODIMENTS

Figure 1:
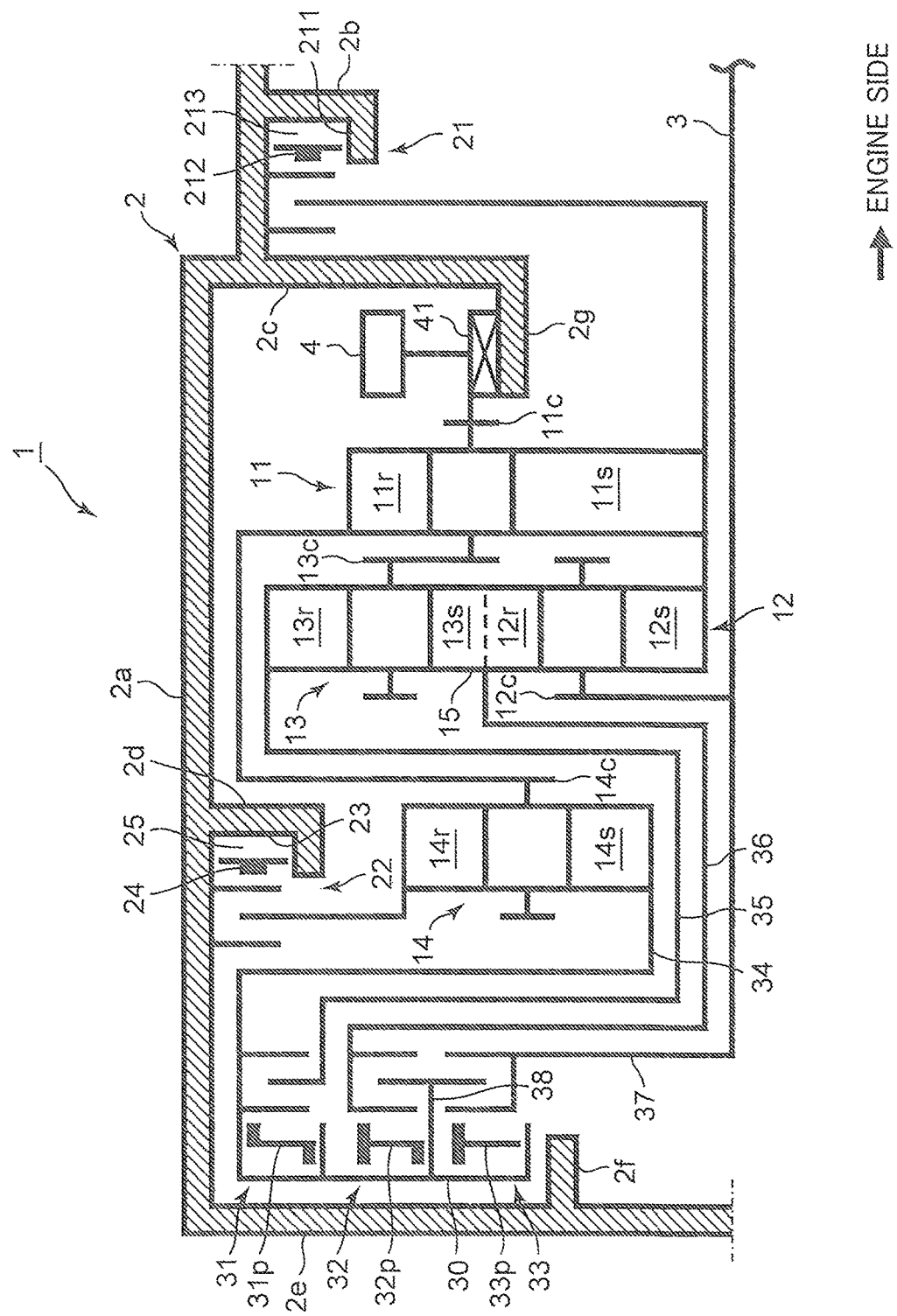
FIG. 1 is a skeleton diagram of an automatic transmission according to an embodiment of the present invention.

[Overall Configuration of Automatic Transmission]
FIG. 1 is a skeleton diagram illustrating the configuration of an automatic transmission 1 for an automobile (vehicle) according to an embodiment of the present invention. The automatic transmission 1 includes a transmission case 2, and an input shaft 3 (input section) extending from the engine side, an output gear 4 (output section), four planetary gear sets (first, second, third, and fourth planetary gear sets 11, 12, 13, and 14), two brakes (first and second brakes 21 and 22), and three clutches (first, second, and third clutches 31, 32, and 33), which are arranged in the transmission case 2. The four planetary gear sets, the two brakes, and the three clutches serve as a gear shifting mechanism.

The input shaft 3 is a shaft to which power generated by the engine (drive source) is input. The output gear 4 is a gear configured to output a drive force adjusted to a predetermined gear ratio by the gear shifting mechanism. This embodiment exemplifies a so-called torque converter-less automatic transmission in which the power of the engine is input to the input section without intervention of a torque converter (hydraulic power transmission device).

The transmission case 2 includes an outer peripheral wall 2a, a first intermediate wall 2b provided at the end of the outer peripheral wall 2a on the engine side, a second intermediate wall 2c provided on a side opposite to the engine side with respect to the first intermediate wall 2b, a third intermediate wall 2d provided at the middle of the outer peripheral wall 2a in an axial direction, a side wall 2e provided at the end of the outer peripheral wall 2a on the side opposite to the engine side, a boss portion 2f provided so as to extend from the center of the side wall 2e toward the engine side, and a cylindrical portion 2g provided so as to extend from the inner peripheral end of the second intermediate wall 2c toward the side opposite to the engine side.

The four planetary gear sets 11 to 14 are arranged in the order of the first planetary gear set 11, the inner peripheral second planetary gear set 12 and the outer peripheral third planetary gear set 13 that are arranged while being stacked on each other in a radial direction, and the fourth planetary gear set 14 from the engine side. The first planetary gear set 11 includes a carrier 11c, pinions (not shown) supported by the carrier 11c, a sun gear 11s, and a ring gear 11r. The first planetary gear set 11 is a single-pinion planetary gear set in which the pinions directly mesh with the sun gear 11s and the ring gear 11r. The second, third, and fourth planetary gear sets 12, 13, and 14 are also single-pinion planetary gear sets, and include carriers 12c, 13c, and 14c, pinions (not shown), sun gears 12s, 13s, and 14s, and ring gears 12r, 13r, and 14r, respectively.

The ring gear 12r of the second planetary gear set 12 and the sun gear 13s of the third planetary gear set 13 that are arranged while being stacked at two stages in the radial direction are integrated with each other by welding, shrink fitting, or the like. That is, the ring gear 12r and the sun gear 13s are constantly coupled to each other to form an integral rotary element 15. The sun gear 11s of the first planetary gear set 11 and the sun gear 12s of the second planetary gear set 12, the ring gear 11r of the first planetary gear set 11 and the carrier 14c of the fourth planetary gear set 14, and the carrier 11c of the first planetary gear set 11 and the carrier 13c of the third planetary gear set 13 are constantly coupled to each other, respectively. The input shaft 3 is constantly coupled to the carrier 12c of the second planetary gear set 12. The output gear 4 is constantly coupled to each of the carrier 11c of the first planetary gear set 11 and the carrier 13c of the third planetary gear set 13. The output gear 4 is supported by the cylindrical portion 2g of the transmission case 2 through intermediation of a bearing 41 in a freely rotatable manner.

A first rotary member 34 is coupled to the sun gear 14s of the fourth planetary gear set 14. The first rotary member 34 extends toward the side opposite to the engine side. Similarly, a second rotary member 35 is coupled to the ring gear 13r of the third planetary gear set 13, and a third rotary member 36 is coupled to the integral rotary element 15. The rotary members 35 and 36 also extend toward the side opposite to the engine side. A fourth rotary member 37 is coupled to the carrier 12c of the second planetary gear set 12 through intermediation of the input shaft 3.

The first brake 21 is arranged on the first intermediate wall 2b of the transmission case 2. The first brake 21 includes a cylinder 211, a piston 212 fitted to the cylinder 211, and a working hydraulic pressure chamber 213 defined by the cylinder 211 and the piston 212. By supplying a predetermined engaging hydraulic pressure to the working hydraulic pressure chamber 213, friction plates of the first brake 21 are engaged to fix the sun gear 11s of the first planetary gear set 11 and the sun gear 12s of the second planetary gear set 12 to the transmission case 2.

The second brake 22 is arranged on the third intermediate wall 2d. The second brake 22 includes a cylinder 23, a piston 24 fitted to the cylinder 23, and an engaging hydraulic pressure chamber 25 defined by the cylinder 23 and the piston 24. By supplying a predetermined engaging hydraulic pressure to the engaging hydraulic pressure chamber 25, friction plates of the second brake 22 are engaged to fix the ring gear 14r of the fourth planetary gear set 14 to the transmission case 2. This embodiment describes an example in which a frictional engagement element according to the present invention is applied to the second brake 22. The second brake 22 is described later in detail with reference to FIG. 3 and other subsequent figures.

The first to third clutches 31 to 33 are arranged in the transmission case 2 at the end located on the side opposite to the engine side. The first to third clutches 31 to 33 are arranged at the same positions in the axial direction while being stacked on each other in the radial direction so that the second clutch 32 is located on an inner peripheral side of the first clutch 31 and the third clutch 33 is located on an inner peripheral side of the second clutch 32.

The first clutch 31 connects or disconnects the sun gear 14s of the fourth planetary gear set 14 to or from the ring gear 13r of the third planetary gear set 13. In other words, the first clutch 31 switches a connection state between the first rotary member 34 coupled to the sun gear 14s and the second rotary member 35 coupled to the ring gear 13r.

The second clutch 32 connects or disconnects the sun gear 14s of the fourth planetary gear set 14 to or from the integral rotary element 15 (that is, the ring gear 12r of the second planetary gear set 12 and the sun gear 13s of the third planetary gear set 13). In other words, the second clutch 32 switches a connection state between the first rotary member 34 coupled to the sun gear 14s and the third rotary member 36 coupled to the integral rotary element 15.

The third clutch 33 connects or disconnects the sun gear 14s of the fourth planetary gear set 14 to or from the input shaft 3 and the carrier 12c of the second planetary gear set 12. In other words, the third clutch 33 switches a connection state between the first rotary member 34 coupled to the sun gear 14s and the fourth rotary member 37 coupled to the carrier 12c through intermediation of the input shaft 3.

The connection state between the first rotary member 34 and the second rotary member 35 is switched by the first clutch 31, the connection state between the first rotary member 34 and the third rotary member 36 is switched by the second clutch 32, and the connection state between the first rotary member 34 and the fourth rotary member 37 is switched by the third clutch 33. That is, the first rotary member 34 is a common rotary member on one side out of the two rotary members for which each of the clutches 31 to 33 switches the connection state. Therefore, a common rotary member 30 having a wall portion orthogonal to the axis is arranged in proximity to the side wall 2e of the transmission case 2 on the side opposite to the engine side with respect to the first to third clutches 31 to 33. The first rotary member 34 is coupled to the common rotary member 30.

The common rotary member 30 is shared among the first to third clutches 31 to 33, and cylinders, pistons, working hydraulic pressure chambers, working hydraulic pressure paths, centrifugal balance hydraulic pressure chambers, centrifugal balance chamber forming members, and the like that are provided to the respective clutches 31 to 33 are supported by the common rotary member 30. FIG. 1 simply illustrates pistons 31p, 32p, and 33p of the first, second, and third clutches 31, 32, and 33. Note that a common member 38 configured to retain friction plates of the second clutch 32 and the third clutch 33 is assembled to those clutches.

As described above, the automatic transmission 1 of this embodiment includes the gear shifting mechanism configured to change a gear ratio between the input shaft 3 and the output gear 4, including the first to fourth planetary gear sets 11 to 14, and the first and second brakes 21 and 22 and the first to third clutches 31 to 33 that serve as five frictional engagement elements. FIG. 2 is an engagement table of the five frictional engagement elements provided to the automatic transmission 1. As shown in the engagement table of FIG. 2, three frictional engagement elements out of the five frictional engagement elements are selectively engaged (symbols "O") to achieve first to eighth forward gears and a reverse gear. In FIG. 2, CL1, CL2, and CL3 denote the first, second, and third clutches 31 to 33, and BR1 and BR2 denote the first and second brakes 21 and 22, respectively. In this embodiment, the first clutch 31 (CL1), the first brake 21 (BR1), and the second brake 22 (BR2) are frictional engagement elements for achieving a starting gear ratio at the time of forward driving of the vehicle.

[Details of Frictional Engagement Element]

Figure 3:
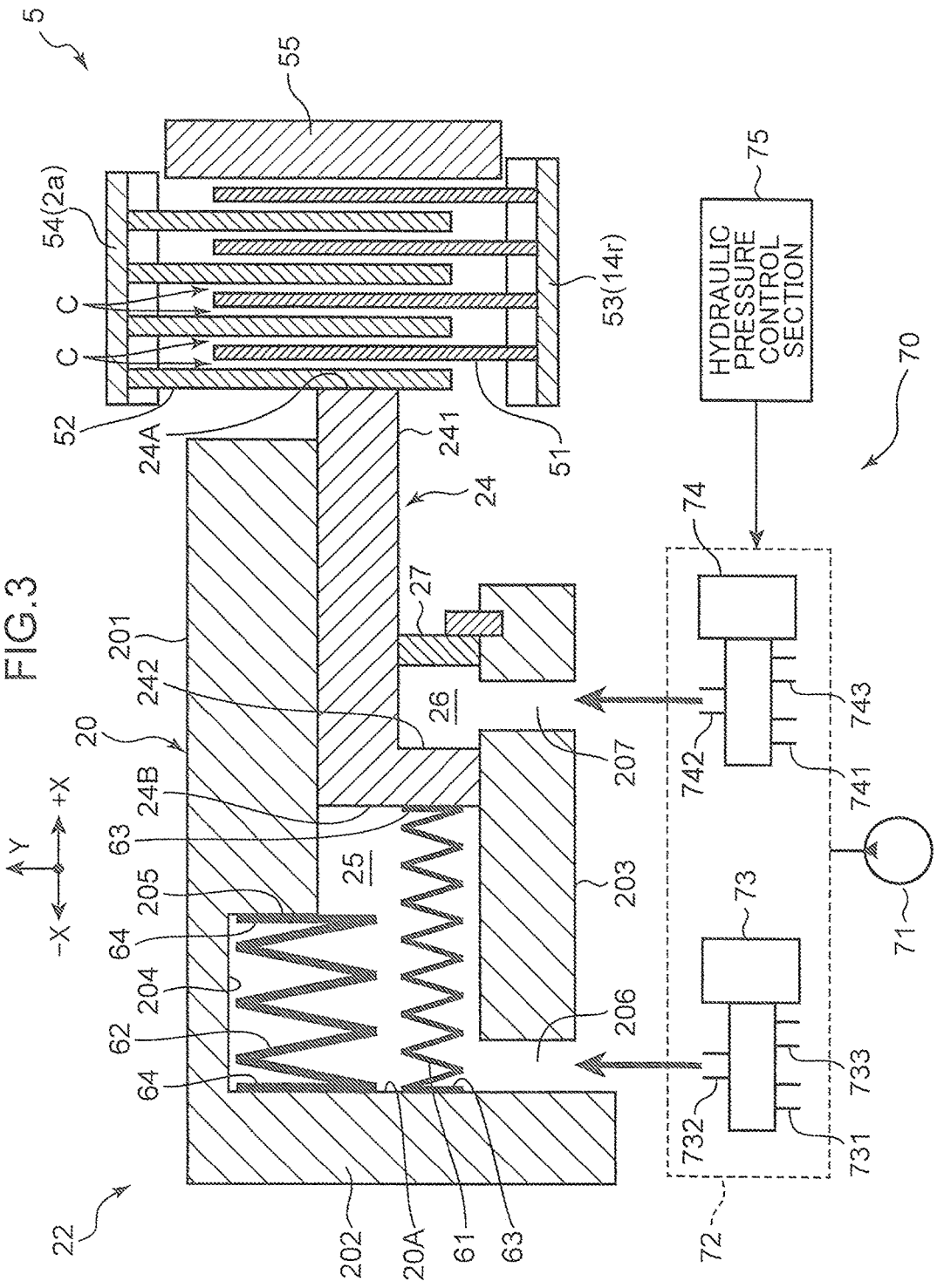
FIG. 3 is a schematic sectional view illustrating the configuration of the frictional engagement element.

FIG. 3 is a schematic sectional view illustrating the configuration of the frictional engagement element of the gear shifting mechanism according to the embodiment of the present invention. The gear shifting mechanism changes the gear ratio between the input shaft 3 and the output gear 4. In this case, description is given of an example in which the frictional engagement element is applied to the second brake 22. In FIG. 3 (and FIGS. 4 to 9 subsequent thereto), the axial direction of the input shaft 3 is represented by an X direction, and the radial direction of the automatic transmission 1 is represented by a Y direction. Further, regarding the X direction, the left side of the figure is represented by "−X", and the right side of the figure is represented by "+X" for convenience.

The second brake 22 includes a housing 20, the piston 24 and the engaging hydraulic pressure chamber 25 described above, a releasing hydraulic pressure chamber 26, a ring member 27, a friction plate unit 5 (plurality of friction plates), first compression coil springs 61 (urging mechanism), and second compression coil springs 62. A hydraulic mechanism 70 is annexed to the second brake 22 described above. The hydraulic mechanism 70 includes an oil pump 71, a hydraulic pressure circuit 72, and a hydraulic pressure control section 75.

The housing 20 is a part of the transmission case 2 illustrated in FIG. 1, and includes an outer tubular portion 201, a flange portion 202, and an inner tubular portion 203. The outer tubular portion 201 is a tubular portion extending in the axial direction of the input shaft 3 (FIG. 1), and is a portion corresponding to the outer peripheral wall 2a of the transmission case 2. The flange portion 202 and the inner tubular portion 203 are portions corresponding to the intermediate wall 2d of the transmission case 2. The flange portion 202 is a portion extending radially inward from the outer tubular portion 201. The inner tubular portion 203 is arranged on a radially inner side of the outer tubular portion 201 at a predetermined distance from the outer tubular portion 201. A space formed by the outer tubular portion 201, the flange portion 202, and the inner tubular portion 203 constitutes a space of the cylinder 23 of the second brake 22 described above.

A groove portion 204 is formed in a region adjacent to the flange portion 202 on the inner surface of the outer tubular portion 201. Thus, a receiving surface 205 opposed to an inner surface 20A of the flange portion 202 at a predetermined distance in the axial direction is formed on the inner surface side of the outer tubular portion 201. The second compression coil spring 62 is accommodated in the groove portion 204. The inner tubular portion 203 is provided with a first supply port 206 for supplying a hydraulic pressure to the engaging hydraulic pressure chamber 25, and a second supply port 207 for supplying a hydraulic pressure to the releasing hydraulic pressure chamber 26.

The piston 24 is a member movable in the axial direction between the outer tubular portion 201 and the inner tubular portion 203, and includes a pressing piece 241 configured to slide against the inner peripheral surface of the outer tubular portion 201, and a pressure receiving piece 242 opposed to the flange portion 202. The pressing piece 241 has a tip end surface 24A located on a tip end side (+X side) in a moving direction and configured to apply a pressing force to the friction plate unit 5. Further, the pressure receiving piece 242 has a rear end surface 24B located on a rear end side (−X side) and configured to receive a pressing force of the hydraulic pressure and urging forces of the first and second compression coil springs 61 and 62. The piston 24 moves between a releasing position (position illustrated in FIG. 5) where the friction plate unit 5 is brought into a released state, and an engaging position (position illustrated in FIG. 9) where the friction plate unit 5 is brought into an engaged state by applying a pressing force to the friction plate unit 5.

The engaging hydraulic pressure chamber 25 is a space to be supplied with a hydraulic pressure for moving the piston 24 in a direction toward the engaging position. The engaging hydraulic pressure chamber 25 is a space defined by the outer tubular portion 201, the flange portion 202, and the inner tubular portion 203 of the housing 20 and the pressing piece 241 of the piston 24. In this embodiment, the first and second compression coil springs 61 and 62 are arranged in the engaging hydraulic pressure chamber 25.

The releasing hydraulic pressure chamber 26 is a space to be supplied with a hydraulic pressure for moving the piston 24 in a direction toward the releasing position. The releasing hydraulic pressure chamber 26 is a space defined by the inner tubular portion 203 of the housing 20, the pressing piece 241 and the pressure receiving piece 242 of the piston 24, and the ring member 27 assembled to the inner tubular portion 203. In this embodiment, a return spring or the like is not arranged in the releasing hydraulic pressure chamber 26.

The friction plate unit 5 includes a plurality of friction plates arranged with clearances therebetween. Specifically, the friction plate unit 5 includes a plurality of drive plates 51 and a plurality of driven plates 52 alternately arrayed with predetermined clearances C therebetween. Facings are bonded to both surfaces of the drive plate 51. The drive plates 51 are spline-coupled to a first spline piece 53, and the driven plates 52 are spline-coupled to a second spline piece 54. The first spline piece 53 is a member corresponding to an outer peripheral portion of the ring gear 14r of the fourth planetary gear set 14 illustrated in FIG. 1. Further, the second spline piece 54 is a member corresponding to an inner peripheral portion of the outer peripheral wall 2a of the transmission case 2.

The tip end surface 24A of the piston 24 abuts against the driven plate 52 located farthest to the −X side to apply a pressing force to the friction plate unit 5. A retaining plate 55 is arranged adjacent to the drive plate 51 located farthest to the +X side. The retaining plate 55 regulates movement of the drive plates 51 and the driven plates 52 in the +X direction.

The first compression coil spring 61 and the second compression coil spring 62 are springs configured to urge the piston 24 in an engaging direction (+X direction) from the releasing position toward the engaging position. The first and second compression coil springs 61 and 62 are arranged on the surface of the piston 24 which is opposite to the surface opposed to the friction plate unit 5. The ends of the first and second compression coil springs 61 and 62 on the −X side are supported by the inner surface 20A of the immovable flange portion 202, and the ends on the +X side abut against the rear end surface 24B of the piston 24 configured to move in the X direction. Note that the second compression coil spring 62 is arranged so as to be accommodated in the groove portion 204. Thus, the receiving surface 205 of the groove portion 204 serves as a regulating surface against which the end of the second compression coil spring 62 on the +X side abuts, thereby regulating stretching of the second compression coil spring 62 in the +X direction.

On the other hand, such a regulating surface is not provided for the first compression coil spring 61, and the first compression coil spring 61 is stretchable to have a free length. The free length of the first compression coil spring 61 is larger than the distance between the inner surface 20A and the receiving surface 205. That is, the working length of the first compression coil spring 61 that applies an urging force to the piston 24 in the +X direction is larger than the working length of the second compression coil spring 62. Thus, the urging forces of both of the first and second compression coil springs 61 and 62 act on the piston 24 up to a position of the receiving surface 205 (first position; position of FIG. 6 described later) from a state in which the piston 24 is located at the releasing position, and only the urging force of the first compression coil spring 61 acts on the piston 24 up to a position where the first compression coil spring 61 stretches from the receiving surface 205 to have a free length (second position; position of FIG. 8 described later).

Further, the second compression coil spring 62 is a larger spring than the first compression coil spring 61. That is, the urging force of the second compression coil spring 62 is set greater than the urging force of the first compression coil spring 61. Thus, an assist of the relatively greater urging force of the second compression coil spring 62 is superimposed on the urging force of the first compression coil spring 61 up to the position of the receiving surface 205 from the releasing position, and hence the moving speed of the piston 24 is increased.

Figure 4:
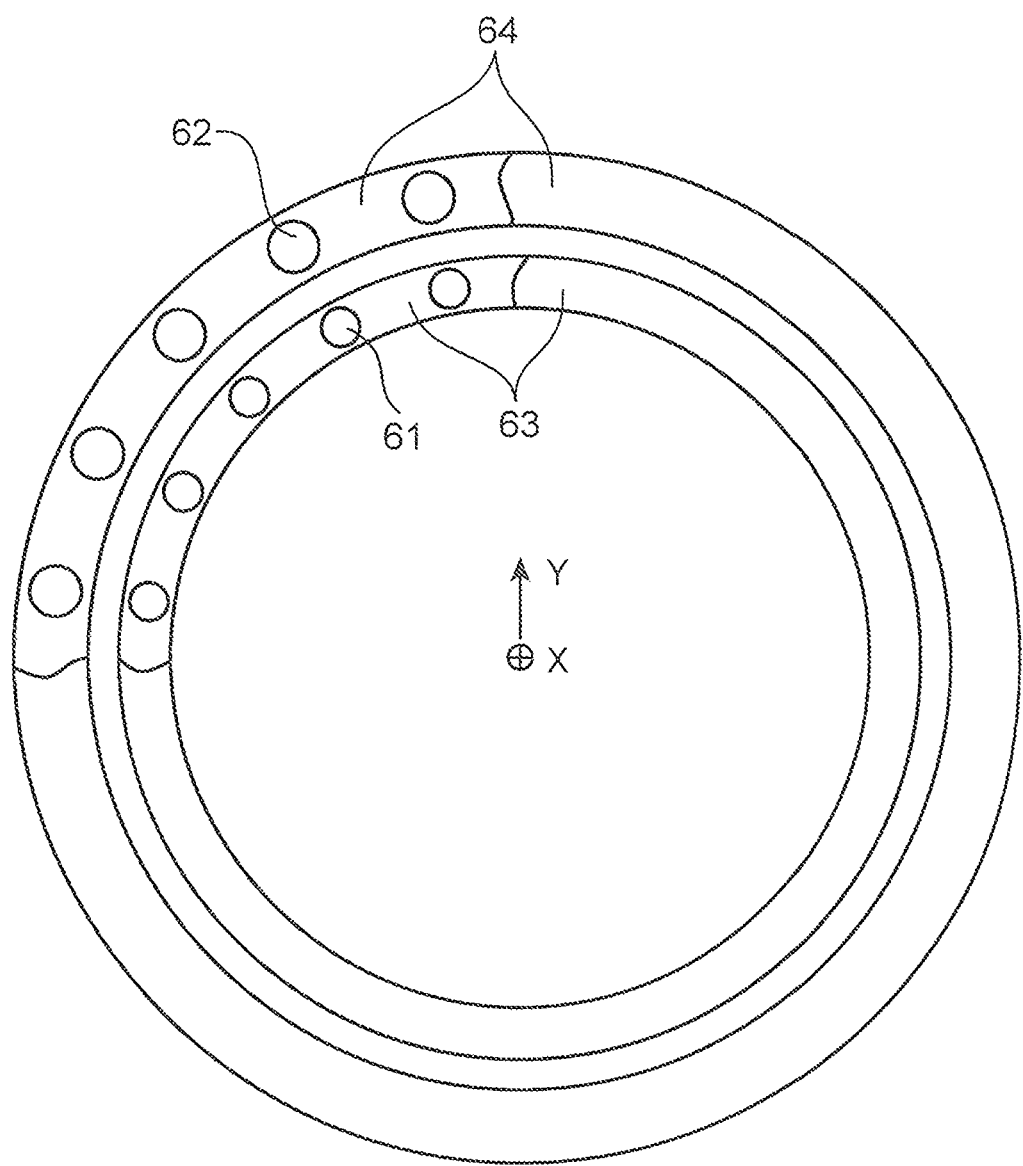
FIG. 4 is a view illustrating an example of arrangement of first and second compression coil springs.

FIG. 4 is a view illustrating an example of arrangement of the first and second compression coil springs 61 and 62. The pluralities of first and second compression coil springs 61 and 62 are each arrayed in an annular form on the disc-like (annular) rear end surface 24B of the piston 24. The first compression coil springs 61 are arranged on a radially inner side of the piston 24, and the second compression coil springs 62 are arranged on a radially outer side of the piston 24. End plates 63 are attached to the ends of the first compression coil springs 61 on the +X side and the −X side, respectively. Similarly, end plates 64 are attached to the ends of the second compression coil springs 62 on the +X side and the −X side, respectively. With the end plates 63 and 64, the urging forces of the first and second compression coil springs 61 and 62 can be applied to the piston 24 stably and uniformly in a circumferential direction.

The arrangement of the first and second compression coil springs 61 and 62 as illustrated in FIG. 4 is an arrangement capable of easily increasing an urging force of a group of the plurality of second compression coil springs 62. Specifically, the second compression coil springs 62 are arranged on the radially outer side of the piston 24, and a wider arrangement space can be secured for the second compression coil springs 62 than for the first compression coil springs 61 because the circumferential length is larger on the radially outer side than on the radially inner side. Thus, larger compression coil springs than the first compression coil springs 61 are employed as the second compression coil springs 62 or a larger number of second compression coil springs 62 than the first compression coil springs 61 are arranged even if the sizes are the same, thereby being capable of easily producing a situation in which the urging force of the group of second compression coil springs 62 is greater than the urging force of the group of first compression coil springs 61.

The oil pump 71 of the hydraulic mechanism 70 is a pump to be driven by the engine so as to cause oil to flow through desired portions and generate predetermined hydraulic pressures. The hydraulic pressure circuit 72 is a hydraulic pressure circuit for achieving the respective gear positions shown in FIG. 2 by selectively supplying the hydraulic pressures to the first and second brakes 21 and 22 and the first to third clutches 31 to 33 that serve as the frictional engagement elements. FIG. 3 only illustrates a first solenoid valve 73 and a second solenoid valve 74 for supplying and discharging the hydraulic pressures to and from the second brake 22.

The first solenoid valve 73 is a valve configured to control the supply of the hydraulic pressure generated by the oil pump 71 to the engaging hydraulic pressure chamber 25 through the first supply port 206 and the discharge of the hydraulic pressure from the engaging hydraulic pressure chamber 25. The first solenoid valve 73 includes an input port 731, an output port 732, and a drain port 733. Through an operation of the solenoid, the input port 731 and the output port 732 are caused to communicate with each other when the hydraulic pressure is supplied to the engaging hydraulic pressure chamber 25, and the output port 732 and the drain port 733 are caused to communicate with each other when the hydraulic pressure is discharged. When a predetermined engaging hydraulic pressure is supplied to the engaging hydraulic pressure chamber 25, the piston 24 moves to the engaging position.

The second solenoid valve 74 is a valve configured to control the supply of the hydraulic pressure generated by the oil pump 71 to the releasing hydraulic pressure chamber 26 through the second supply port 207 and the discharge of the hydraulic pressure from the releasing hydraulic pressure chamber 26. The second solenoid valve 74 includes an input port 741, an output port 742, and a drain port 743. Through an operation of the solenoid, the input port 741 and the output port 742 are caused to communicate with each other when the hydraulic pressure is supplied to the releasing hydraulic pressure chamber 26, and the output port 742 and the drain port 743 are caused to communicate with each other when the hydraulic pressure is discharged. When a predetermined releasing hydraulic pressure is supplied to the releasing hydraulic pressure chamber 26, the piston 24 moves to the releasing position irrespective of the urging forces of the first and second compression coil springs 61 and 62.

The hydraulic pressure control section 75 controls the hydraulic pressures to be supplied to the engaging hydraulic pressure chamber 25 and the releasing hydraulic pressure chamber 26 by controlling the operations of the solenoids of the first and second solenoid valves 73 and 74. In addition, the hydraulic pressure control section 75 controls the respective solenoid valves and the like of the other frictional engagement elements, and also controls the hydraulic pressures to be supplied to the first brake 21 and the first to third clutches 31 to 33.

[Operation of Frictional Engagement Element]

Figure 5:
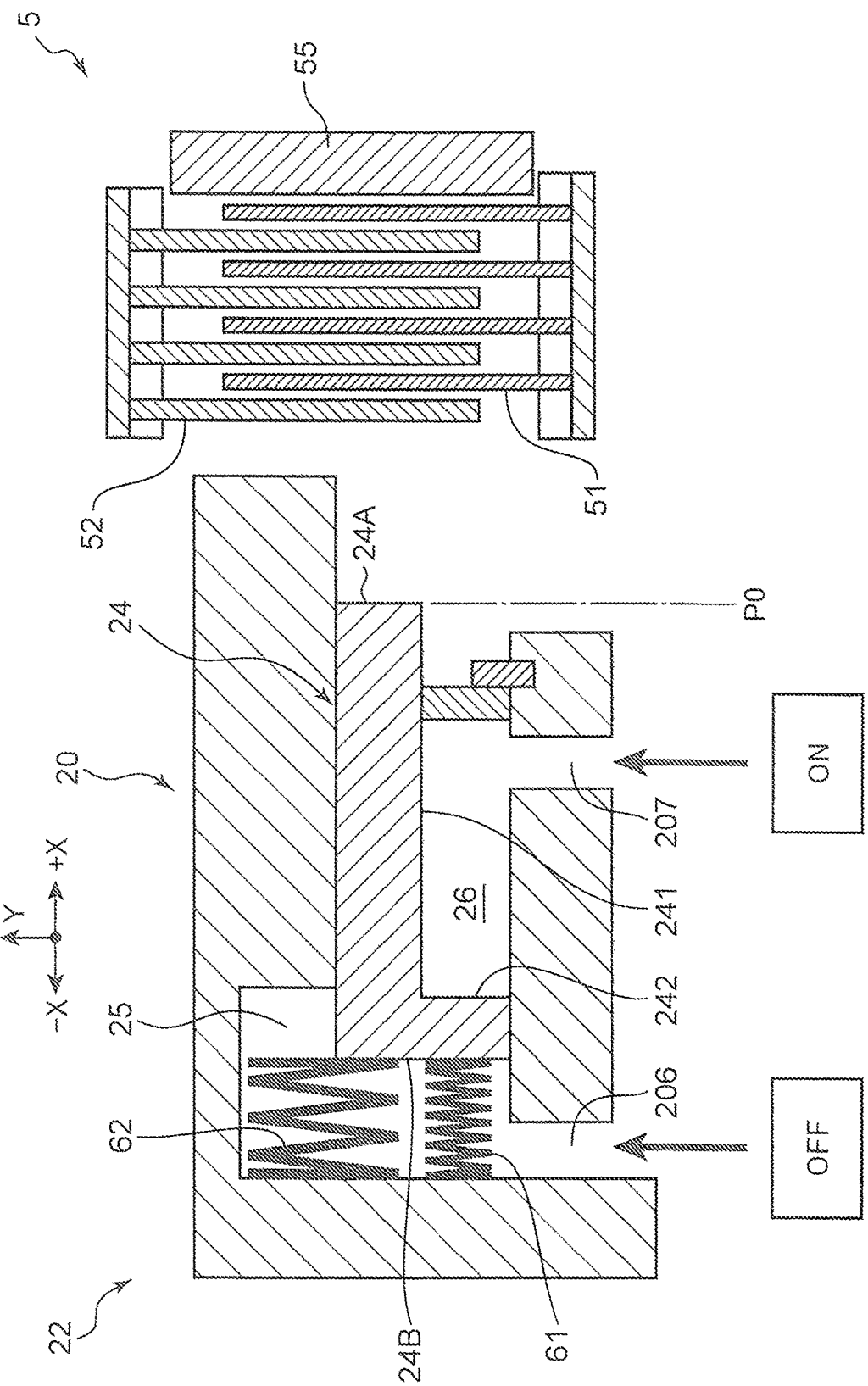
FIG. 5 is a schematic sectional view for describing an operation of the frictional engagement element.

FIGS. 5 to 9 are schematic sectional views for describing an operation of the frictional engagement element. FIG. 5 illustrates a state in which the piston 24 is located at the releasing position. Specifically, the tip end surface 24A of the piston 24 is spaced away from the friction plate unit 5 by a predetermined distance, and the drive plates 51 and the driven plates 52 are in the released state. FIG. 5 illustrates the position of the tip end surface 24A in the X direction as a releasing position P0. At this time, the hydraulic pressure control section 75 prevents the engaging hydraulic pressure from being supplied to the engaging hydraulic pressure chamber 25 (represented by "OFF" in FIG. 5). That is, the hydraulic pressure control section 75 controls the first solenoid valve 73 into a state in which the output port 732 and the drain port 733 are caused to communicate with each other.

On the other hand, the hydraulic pressure control section 75 causes a predetermined releasing hydraulic pressure to be supplied to the releasing hydraulic pressure chamber 26 through the second supply port 207 (represented by "ON" in FIG. 5). That is, the hydraulic pressure control section 75 controls the second solenoid valve 74 into a state in which the input port 741 and the output port 742 are caused to communicate with each other. The releasing hydraulic pressure is a hydraulic pressure at least greater than the urging force of the first compression coil spring 61, and is a hydraulic pressure greater than the superimposed urging force of the first and second compression coil springs 61 and 62 in this embodiment. The pressure receiving piece 242 of the piston 24 is supplied with the releasing hydraulic pressure, and hence the piston 24 moves in the −X direction against the superimposed urging force. The first and second compression coil springs 61 and 62 are brought into the most compressed state.

Figure 6:
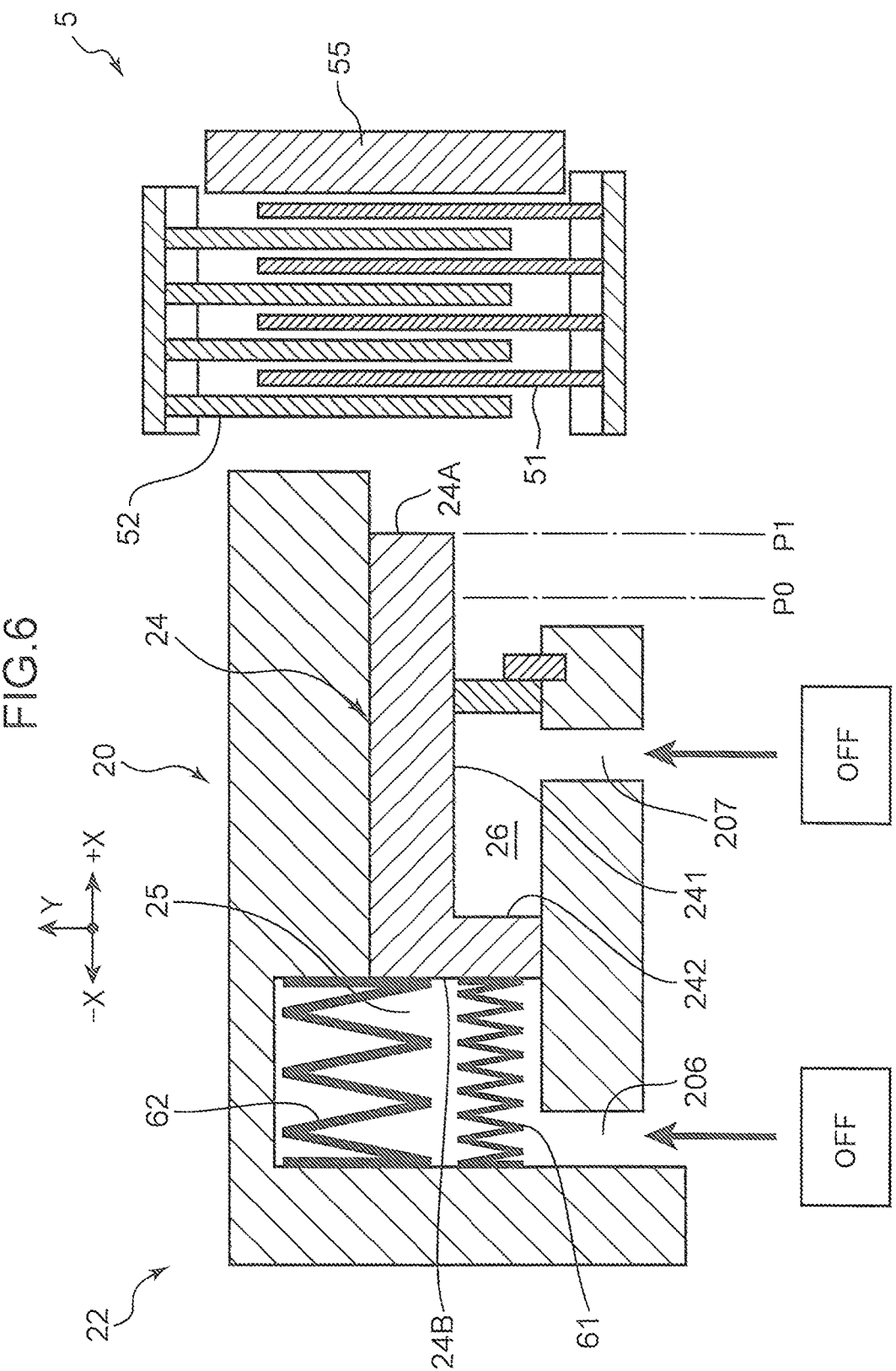
FIG. 6 is a schematic sectional view for describing the operation of the frictional engagement element.

FIG. 6 illustrates a state in which the piston 24 is located at the first position. The first position is set to a predetermined position where the tip end surface 24A of the piston 24 does not abut against the friction plate unit 5. Specifically, the first position is determined by the width of the groove portion 204 in the X direction. FIG. 6 illustrates the position of the tip end surface 24A in the X direction at this time as a first position P1. When a command to move the piston 24 from the releasing position P0 in the engaging direction is issued, the hydraulic pressure control section 75 turns OFF the supply of the releasing hydraulic pressure to the releasing hydraulic pressure chamber 26 (causes the hydraulic pressure to be discharged). The engaging hydraulic pressure chamber 25 is maintained in the OFF state.

By maintaining the releasing hydraulic pressure in the OFF state, the piston 24 is brought into a state in which the piston 24 is freely movable in the +X direction. When the piston 24 then moves from the releasing position P0 to the first position P1, the piston 24 is subjected to the urging forces of both of the first and second compression coil springs 61 and 62 in the superimposed state. Thus, the piston 24 is forcefully pressed in the +X direction to move in the engaging direction at high speed. That is, the piston 24 can start to move in the engaging direction quickly.

Figure 7:
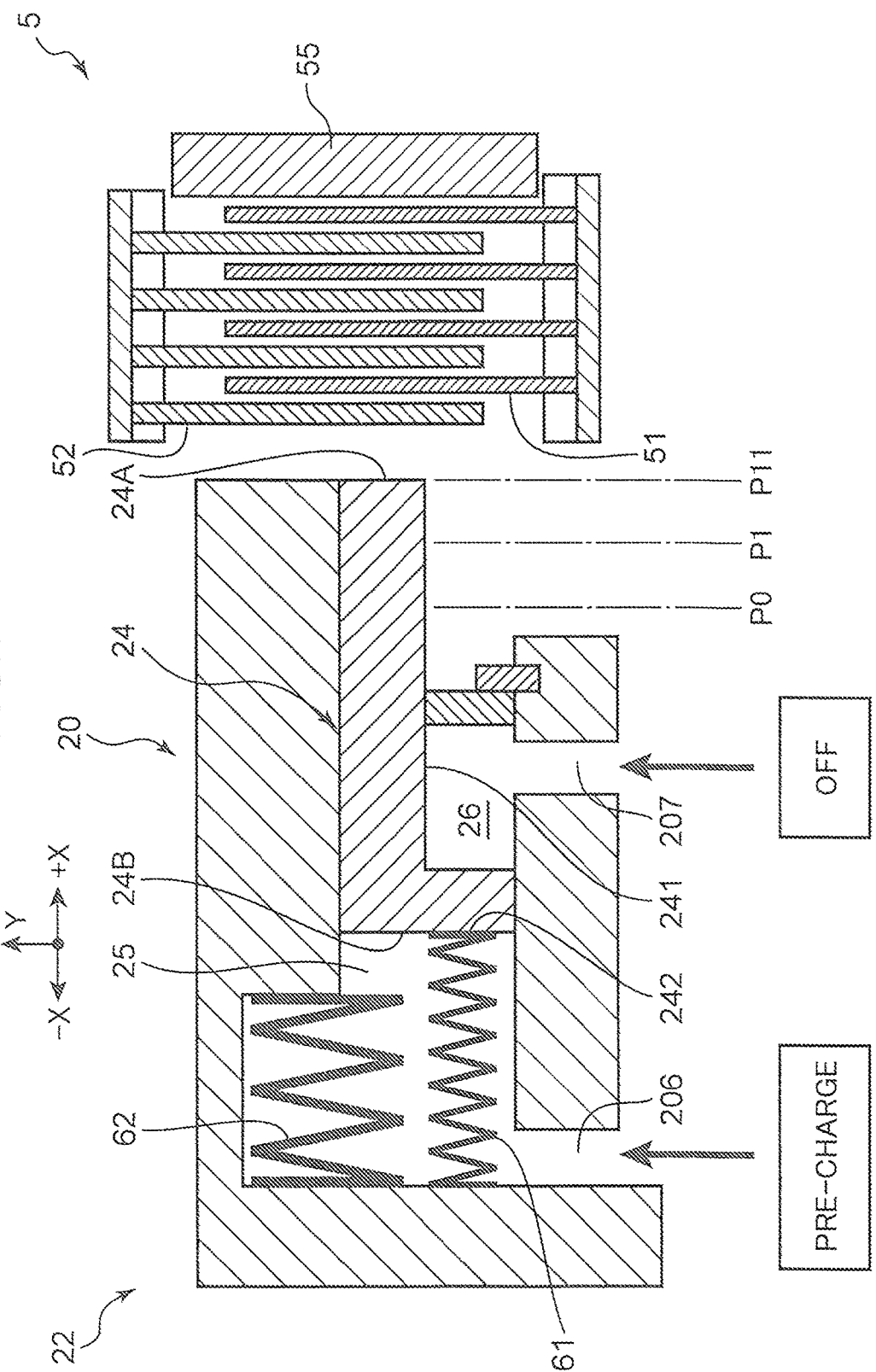
FIG. 7 is a schematic sectional view for describing the operation of the frictional engagement element.

FIG. 7 illustrates a state in which the piston 24 has further moved from the first position P1 in the engaging direction by a predetermined distance. In this state, only the urging force of the first compression coil spring 61 out of the two compression coil springs acts on the piston 24. FIG. 7 illustrates the position of the tip end surface 24A in the X direction at this time as an immediate pre-contact position P11.

At a timing when the piston 24 has reached the first position P1, the hydraulic pressure control section 75 causes a pre-charge hydraulic pressure lower than the engaging hydraulic pressure to be supplied to the engaging hydraulic pressure chamber 25. The releasing hydraulic pressure chamber 26 is maintained in the OFF state. Through the sudden movement of the piston 24 from the releasing position P0 to the first position P1, the engaging hydraulic pressure chamber 25 has a negative pressure inside. The negative pressure hinders the movement of the piston 24 in the +X direction. Therefore, the pre-charge hydraulic pressure is supplied to the engaging hydraulic pressure chamber 25 to assist the movement of the piston 24 in the +X direction. Note that the pre-charge hydraulic pressure is such a hydraulic pressure as to remove the negative pressure resistance, and the movement of the piston 24 from the first position P1 to a next second position P2 (FIG. 8) depends solely on the urging force of the first compression coil spring 61. Thus, the piston 24 moves relatively slowly from the first position P1 to the second position P2 as compared to the case in which the piston 24 moves from the releasing position P0 to the first position P1.

Figure 8:
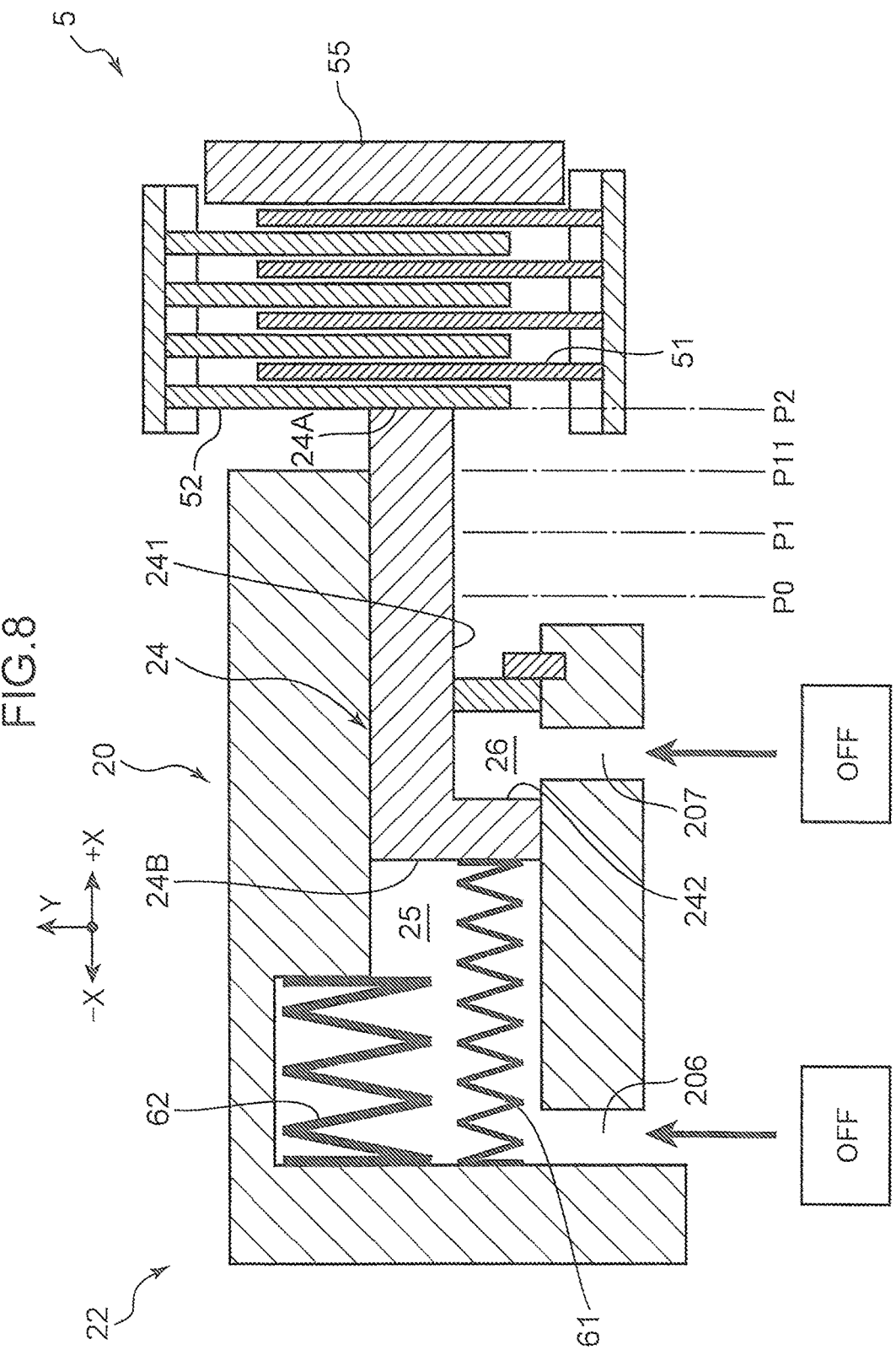
FIG. 8 is a schematic sectional view for describing the operation of the frictional engagement element.

FIG. 8 illustrates a state in which the piston 24 is located at the second position where the tip end surface 24A thereof abuts against the friction plate unit 5 (driven plate 52) and the clearances C between the drive plates 51 and the driven plates 52 are reduced. At the second position, the first compression coil spring 61 is brought into the most stretched state, but the piston 24 has not reached the engaging position. FIG. 8 illustrates the position of the tip end surface 24A in the X direction at this time as the second position P2. During a period in which the piston 24 moves from the immediate pre-contact position P11 to the second position P2, the hydraulic pressure control section 75 stops the supply of the pre-charge hydraulic pressure to the engaging hydraulic pressure chamber 25. Thus, at the second position P2, the supply of the hydraulic pressures to both of the engaging hydraulic pressure chamber 25 and the releasing hydraulic pressure chamber 26 is turned OFF.

The second position P2 corresponds to a starting preparation state in which the vehicle can be started at any time, and corresponds to a so-called zero-touch state. The zero-touch state refers to a state in which the clearances C between the drive plates 51 and the driven plates 52 are reduced to the extent close to establishment of frictional engagement therebetween, and a frictional engagement force is generated therebetween when the piston 24 is further moved in the +X direction. In this embodiment, the zero-touch state can stably be produced by the urging force of the first compression coil spring 61, and can be maintained as well. In other words, the working length of the first compression coil spring 61 is selected so that the zero-touch state can be produced. In this embodiment, the first compression coil spring 61 corresponds to urging mechanism for pressing the piston 24 so as to reduce the clearances C without causing the piston 24 to reach the engaging position.

Figure 9:
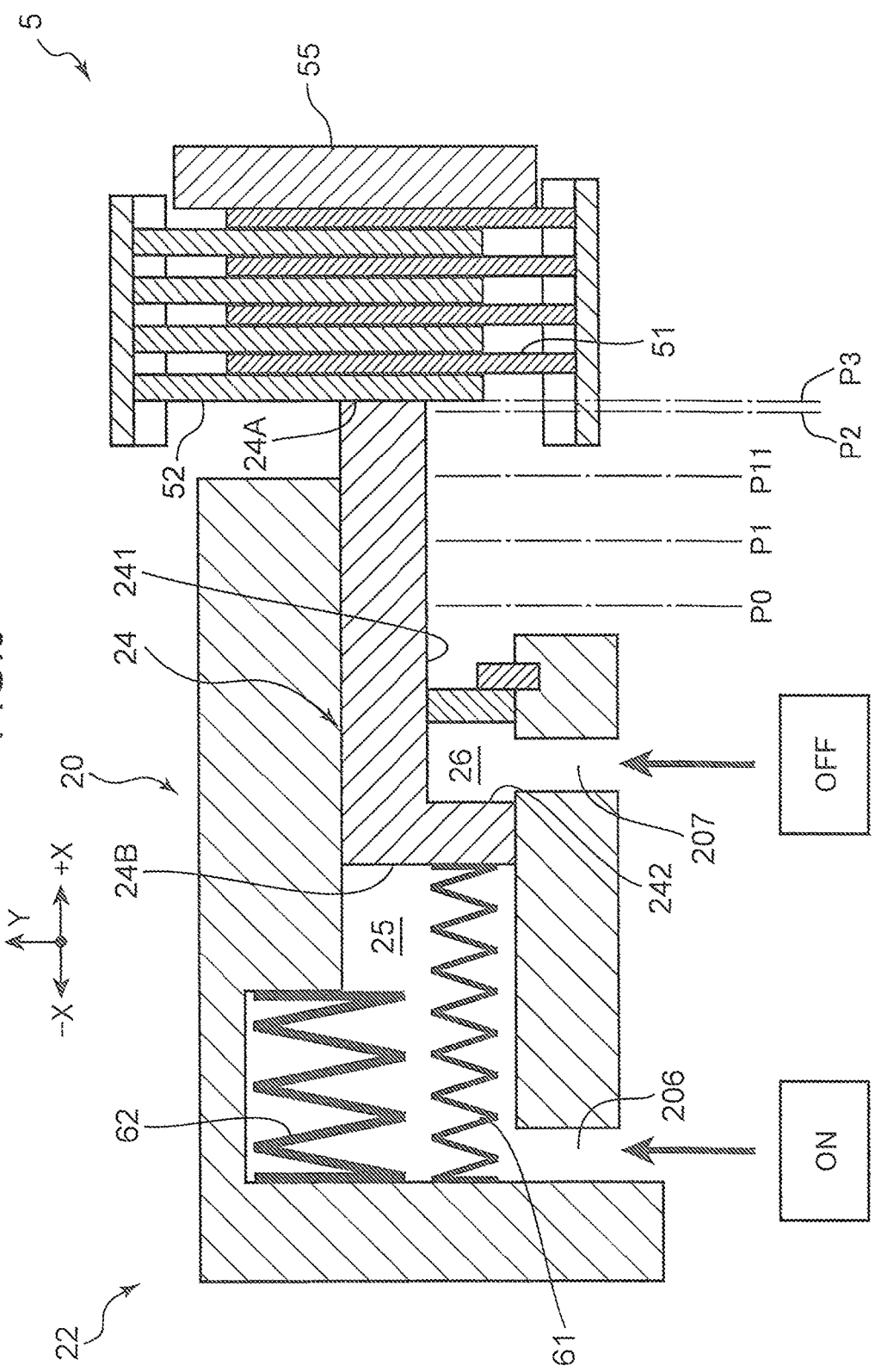
FIG. 9 is a schematic sectional view for describing the operation of the frictional engagement element.

FIG. 9 illustrates a state in which the piston 24 has reached the engaging position. Specifically, the tip end surface 24A of the piston 24 presses the driven plate 52 in the +X direction, and the drive plates 51 and the driven plates 52 are brought into the engaged state. FIG. 9 illustrates the position of the tip end surface 24A in the X direction at this time as an engaging position P3. At this time, the engaging hydraulic pressure chamber 25 is brought into an ON state in which the engaging hydraulic pressure is supplied. The releasing hydraulic pressure chamber 26 is maintained in the OFF state.

When a starting instruction on forward or reverse driving is issued while the piston 24 is located at the second position P2 in the zero-touch state, the hydraulic pressure control section 75 causes the engaging hydraulic pressure to be supplied to the engaging hydraulic pressure chamber 25. The pressure receiving piece 242 receives the engaging hydraulic pressure, and the piston 24 further moves from the second position P2 in the +X direction to reach the engaging position P3. Thus, the drive plates 51 and the driven plates 52 are engaged with each other, and an engaging force is generated therebetween.

When the drive plates 51 and the driven plates 52 are disengaged from each other, the hydraulic pressure control section 75 brings the engaging hydraulic pressure chamber 25 into an OFF state, and brings the releasing hydraulic pressure chamber 26 into an ON state in which the releasing hydraulic pressure is supplied thereto. Through this control, the piston 24 returns to the releasing position P0 illustrated in FIG. 5.

[Control to be Executed when Vehicle is Started]

Figure 10:
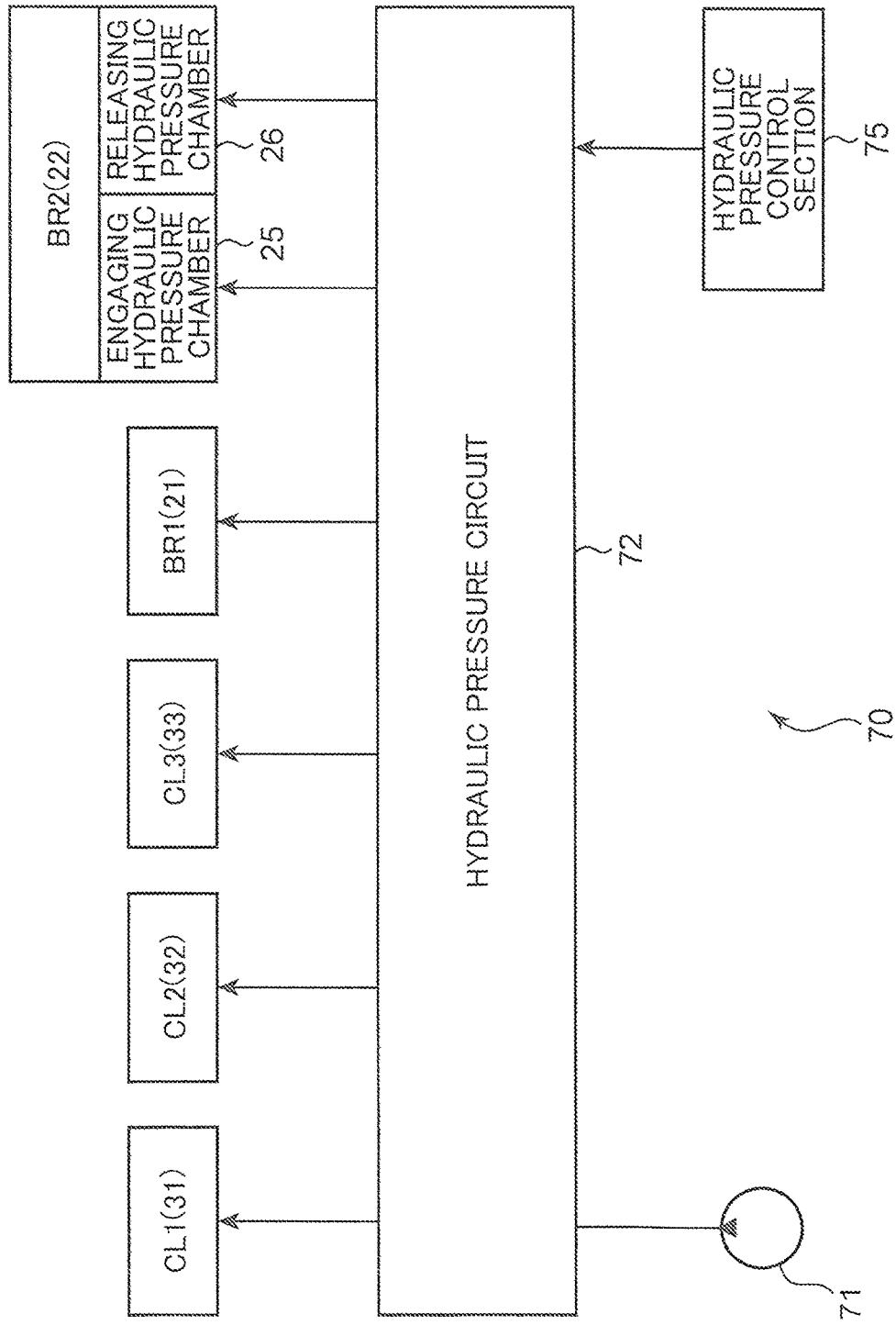
FIG. 10 is a block diagram illustrating hydraulic pressure routes of the automatic transmission.

Next, description is given of hydraulic pressure control to be executed in the automatic transmission 1 when the vehicle is started. FIG. 10 is a block diagram illustrating hydraulic pressure routes of the automatic transmission 1, and FIG. 11 is a diagram in the form of a table showing how the hydraulic pressures are supplied to the respective frictional engagement elements when the vehicle is started from a stopped state. FIG. 3 illustrates the hydraulic pressure circuit 72 corresponding to the second brake 22, but FIG. 10 illustrates the hydraulic pressure circuit 72 corresponding to all the frictional engagement elements (first and second brakes 21 and 22 and first to third clutches 31 to 33). The hydraulic pressure circuit 72 includes solenoid valves for supplying and discharging the hydraulic pressures to and from the respective frictional engagement elements.

As shown in FIG. 2, frictional engagement elements to be engaged when the vehicle is started from the stopped state, that is, when a gear ratio of the first forward gear (starting gear ratio) is achieved are the first clutch 31 (CL1; other frictional engagement element), the first brake 21 (BR1; other frictional engagement element), and the second brake 22 (BR2; predetermined frictional engagement element) in this embodiment. Thus, FIG. 11 only shows those three frictional engagement elements in the table. In the boxes on the first clutch 31 and the first brake 21 of FIG. 11, "ON" indicates that the first clutch 31 and the first brake 21 are in the engaged state, and "OFF" indicates that the first clutch 31 and the first brake 21 are in the disengaged state (released state). In the boxes on the second brake 22, "ON" indicates a state in which the engaging hydraulic pressure or the releasing hydraulic pressure is supplied, and "OFF" indicates a state in which the engaging hydraulic pressure or the releasing hydraulic pressure is not supplied.

Referring to FIG. 11, when the vehicle is stopped, the hydraulic pressure control section 75 brings the first clutch 31 and the first brake 21 into an OFF state in which the engaging hydraulic pressure is not supplied thereto. Further, the hydraulic pressure control section 75 brings the engaging hydraulic pressure chamber 25 into an OFF state, and brings the releasing hydraulic pressure chamber 26 into an ON state in which a predetermined releasing hydraulic pressure is supplied thereto (state illustrated in FIG. 5).

Next, the vehicle is switched from the stopped state to a starting preparation state. The starting preparation state of the vehicle refers to a state in which the vehicle is in the stopped state but the zero-touch state described above is produced. In the zero-touch state, the hydraulic pressure control section 75 brings the first clutch 31 and the first brake 21 into an ON state in which the engaging hydraulic pressure is supplied thereto. For the second brake 22, on the other hand, the hydraulic pressure control section 75 brings, as described above, the engaging hydraulic pressure chamber 25 into an OFF state in which the engaging hydraulic pressure is not supplied thereto, and brings the releasing hydraulic pressure chamber 26 into an OFF state in which the releasing hydraulic pressure thereof is released (state illustrated in FIG. 8).

Specifically, in the starting preparation state (stopped state), the hydraulic pressure control section 75 brings the engaging hydraulic pressure chamber 25 of the second brake 22 into a state in which a hydraulic pressure lower than the engaging hydraulic pressure is supplied (OFF state), and brings the first clutch 31 and the first brake 21, which are the other frictional engagement elements for achieving the starting gear ratio, into a state in which the engaging hydraulic pressure is supplied (ON state). Thus, there is produced a state in which the starting gear ratio is achieved by switching the second brake 22 to the engaged state lastly. Moreover, in the zero-touch state, the piston 24 presses the friction plate unit 5 with the urging force of the first compression coil spring 61, thereby producing a state in which the clearances C between the drive plates 51 and the driven plates 52 are reduced.

When a starting instruction is issued in the starting preparation state (starting state), the hydraulic pressure control section 75 also brings the engaging hydraulic pressure chamber 25 of the second brake 22 into an ON state in which the engaging hydraulic pressure is supplied thereto as well as the first clutch 31 and the first brake 21. Thus, the starting gear ratio is achieved, and the vehicle travels forward. In this manner, the switching from the starting preparation state to the starting state is achieved only by engaging the second brake 22 that has already been in the zero-touch state, and hence the response to achieve the starting gear ratio from the stopped state is increased greatly. Note that, when the starting instruction is not issued in the starting preparation state, the second brake 22 waits in the zero-touch state, and when a stopping instruction is issued, a hydraulic pressure state of "STOP" in FIG. 11 is produced.

In this embodiment, the reason why the second brake 22 is selected as the frictional engagement element configured to produce the zero-touch state with the urging force of the compression coil spring is as follows. As shown in FIG. 2, the gear shifting mechanism of this embodiment is a stepped gear shifting mechanism ranging from the first gear (first gear position) at which the starting gear ratio is achieved to the eighth gear (N-th gear position) at which the top speed gear ratio is achieved in the forward driving. The second brake 22 is a frictional engagement element which is continuously brought into the engaged state so as to achieve the gear ratios of the first gear to the fifth gear ((N−A)th gear position; A=3 in this embodiment) out of the eight gears.

In contrast, in the range from the first gear to the fifth gear, the first clutch 31 is a frictional engagement element which is not engaged at the second gear and the fourth gear, and the first brake 21 is a frictional engagement element which is not engaged at the third gear to the fifth gear. More specifically, from the viewpoint of continuous engagement from the starting gear ratio, the first clutch 31 is a frictional engagement element in which the continuity is lost only at the first gear ((N−B)th gear position; B=7 in this case). Further, the first brake 21 is a frictional engagement element which is continuously engaged from the starting gear ratio to the second gear ((N−B)th gear position; B=6 in this case). That is, among the three frictional engagement elements for achieving the starting gear ratio, the second brake 22 which is continuously engaged up to the fifth gear is highest in the gear position on a high-speed side in the continuous engagement from the starting gear ratio (B>A).

For this reason, it can be said that the second brake 22 is a frictional engagement element having the highest versatility at low-speed to middle-speed gear ratios. That is, the second brake 22 is a frictional engagement element which is constantly engaged when the low-speed to middle-speed gear ratios are achieved on the basis of a predetermined gear shift map. For example, in a scene in which the vehicle is suddenly decelerated and then accelerated again, the second brake 22 is constantly engaged even when a gear ratio of any one of the first gear to the fifth gear is achieved on the basis of the gear shift map. Thus, by selecting the second brake 22 as the frictional engagement element configured to produce the zero-touch state, gear shifting that is excellent in the response and causes no engagement shock can be achieved.

[Actions and Effects]

With the frictional engagement element or the automatic transmission according to this embodiment described above, the following actions and effects are attained. The second brake 22 to which the frictional engagement element according to this embodiment is applied includes the first compression coil spring 61 configured to urge the piston 24 to the second position P2 so that the piston 24 abuts against the friction plate unit 5 (driven plate 52) and the clearances C between the drive plates 51 and the driven plates 52 (between the friction plates) are reduced while preventing the piston 24 from reaching the engaging position P3.

The automatic transmission 1 of this embodiment is a torque converter-less automatic transmission in which the power of the engine is applied to the input shaft 3 without intervention of a hydraulic power transmission device (torque converter). Thus, if the positional control of the piston is not performed accurately, the clearances C of the plates 51 and 52 serving as the friction plates cannot be reduced accurately. As a result, the engine resistance may increase or the engagement shock may occur.

With the automatic transmission 1 of this embodiment, however, in the second brake 22 which is one of the frictional engagement elements for achieving the starting gear ratio of forward or reverse driving of the vehicle, the piston 24 is moved by the urging force of the first compression coil spring 61 to a position where the clearances C are reduced. Therefore, the problem of deformation of the piston 24 due to the hydraulic pressure does not arise, and the positional accuracy of the piston 24 (positioning at the second position P2) can be made satisfactory. That is, the zero-touch state can stably be produced by the first compression coil spring 61. Thus, in the torque converter-less automatic transmission 1, the increase in the engine resistance or the occurrence of the engagement shock along with the decrease in the positional accuracy of the piston 24 can be suppressed.

In the automatic transmission 1, the first compression coil spring 61 is arranged on the surface of the piston 24 which is opposite to the surface opposed to the friction plate unit 5. Therefore, an urging force required for the urging mechanism can be generated by the stretching force of the first compression coil spring 61, thereby being capable of easily constructing a frictional engagement element that attains the actions and effects of the present invention.

In the hydraulic pressure control of the frictional engagement element, when the vehicle is stopped, the hydraulic pressure control section 75 brings the engaging hydraulic pressure chamber 25 into a state in which a hydraulic pressure lower than the engaging hydraulic pressure is supplied. Specifically, the hydraulic pressure control section 75 brings the engaging hydraulic pressure chamber 25 into an OFF state when the vehicle is stopped, causes a pre-charge hydraulic pressure to be supplied (FIG. 7) in the range from the first position P1 to the second position P2, and brings the engaging hydraulic pressure chamber 25 into an OFF state in the zero-touch state (second position P2). Thus, in the zero-touch state, only the urging force of the first compression coil spring 61 acts on the piston 24. Therefore, the positional control of the piston 24 in the X direction can accurately be performed by only the working length of the first compression coil spring 61.

When the piston 24 has reached the second position P2, the clearances C between the plates 51 and 52 are reduced. Specifically, the plates 51 and 52 are not brought into the engaged state, but the clearances between the plates 51 and 52 are substantially eliminated, and the plates 51 and 52 are brought into a state close to engagement. Thus, by supplying the engaging hydraulic pressure to the engaging hydraulic pressure chamber 25 afterwards, both the plates 51 and 52 can promptly be brought into the engaged state. In this manner, the state close to engagement is produced by the urging force of the first compression coil spring 61, and the engaged state is produced afterwards. Accordingly, the occurrence of the engagement shock can be prevented.

Further, in the starting preparation state (zero-touch state), the hydraulic pressure control section 75 brings the first clutch 31 and the first brake 21 (other frictional engagement elements) into an ON state in which the engaging hydraulic pressure is supplied thereto, and brings the engaging hydraulic pressure chamber 25 of the second brake 22 (predetermined frictional engagement element) into an OFF state in which the engaging hydraulic pressure is not supplied thereto. Thus, there is produced a state in which the starting gear ratio is achieved by switching the second brake 22 to the engaged state lastly. Moreover, in the zero-touch state, the clearances C are reduced by the urging force of the first compression coil spring 61. Thus, the response to achieve the starting gear ratio from the stopped state of the vehicle can be increased greatly.

The second brake 22 is selected as the frictional engagement element configured to produce the zero-touch state with the urging force of the first compression coil spring. The second brake 22 is a frictional engagement element which is continuously brought into the engaged state so as to achieve the gear ratios of the first gear to the fifth gear ((N−A)th gear position), and is also a frictional engagement element having the highest versatility at the low-speed to middle-speed gear ratios. By selecting this second brake 22 as the frictional engagement element configured to produce the zero-touch state, gear shifting that is excellent in the response and causes no engagement shock can be achieved, and the driving performance can be increased.

Further, when the piston 24 is moved toward the releasing position P0, the hydraulic pressure control section 75 causes a hydraulic pressure at least greater than the urging force of the first compression coil spring 61 to be supplied to the releasing hydraulic pressure chamber 26. In the embodiment, the hydraulic pressure control section 75 causes a releasing hydraulic pressure greater than the urging forces of both of the first and second compression coil springs 61 and 62 to be supplied to the releasing hydraulic pressure chamber 26. Thus, the piston 24 can promptly be returned toward the releasing position P0 against the superimposed urging force of the first and second compression coil springs 61 and 62.

As described above, according to this embodiment, in the automatic transmission 1 in which the power of the engine is applied to the input section without intervention of the torque converter, the frictional engagement elements can be engaged with a quick response without increasing the engine resistance.

Description of Modified Embodiments

One embodiment of the present invention is described above, but the present invention is not limited thereto, and the following modified embodiments may be employed.

(1) In the embodiment, the first compression coil spring 61 and the second compression coil spring 62 are exemplified as the urging mechanism. Other urging members may be applied as the urging mechanism as long as the urging force in the engaging direction can be applied to the piston 24 and the urging members can be incorporated in the transmission case 2. For example, a tension coil spring, a belleville spring, a flat spring, and an elastic rubber or resin may be used as the urging mechanism.

Figure 12:
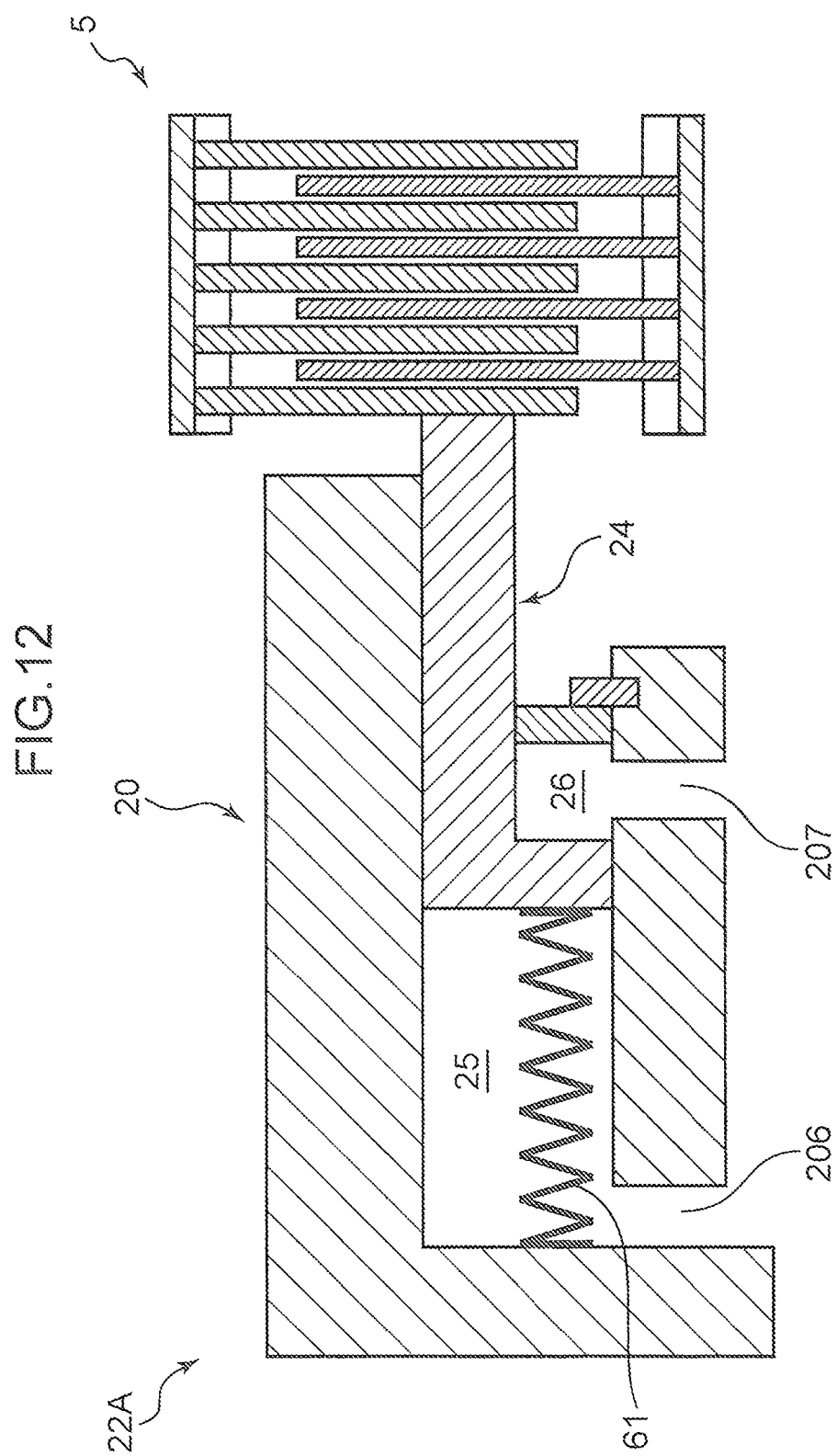
FIG. 12 is a schematic sectional view illustrating a modified example of the frictional engagement element.

(2) In the embodiment, there is described an example using the first and second compression coil springs 61 and 62. The present invention is only required to include at least the first compression coil spring 61, and the application of the second compression coil spring 62 may be omitted. FIG. 12 is a schematic sectional view illustrating a second brake 22A according to a modified example. The second brake 22A has a configuration in which a single urging mechanism, that is, only the first compression coil spring 61 is arranged in the engaging hydraulic pressure chamber 25. The zero-touch state described above is produced when the hydraulic pressures of the engaging hydraulic pressure chamber 25 and the releasing hydraulic pressure chamber 26 are maintained in the OFF state and the first compression coil spring 61 is brought into a stretched state.

(3) In the embodiment, there is described an example in which the frictional engagement element configured to produce the zero-touch state with the urging force of the first compression coil spring 61 is the second brake 22. In place of or in addition to the second brake 22, any one or a plurality of the other frictional engagement elements, that is, the first brake 21 and the first to third clutches 31 to 33 may be selected as the frictional engagement element configured to produce the zero-touch state.

(4) FIGS. 10 and 11 exemplify a case in which the starting gear ratio of forward driving is achieved. When the starting gear ratio of reverse driving is achieved, the combination of the first clutch 31, the first brake 21, and the second brake 22 is replaced with a combination of the third clutch 33, the first brake 21, and the second brake 22 as shown in the engagement table of FIG. 2.

(5) In the embodiment, there is described an example in which the pre-charge hydraulic pressure is supplied to the engaging hydraulic pressure chamber 25 at a timing when the piston 24 has reached the first position P1. As a measure against the resistance to the piston 24 along with the generation of the negative pressure in the engaging hydraulic pressure chamber 25, elastic forces of various elastic members may be used instead of the supply of the pre-charge hydraulic pressure.

(6) In the embodiment, there is described an example in which the first and second compression coil springs 61 and 62 are arranged in the engaging hydraulic pressure chamber 25 as the urging mechanism. In place of this example, urging mechanism such as a tension coil spring may be arranged in the releasing hydraulic pressure chamber 26.

Note that the specific embodiments described above disclose an automatic transmission having the following configurations.

An automatic transmission according to one aspect of the present invention is an automatic transmission for a vehicle, including: an input section to which power generated by a drive source is input; an output section configured to output a drive force; and a gear shifting mechanism configured to change a gear ratio between the input section and the output section. The power is input to the input section without intervention of a hydraulic power transmission device. The gear shifting mechanism includes a predetermined frictional engagement element for achieving a starting gear ratio of the vehicle. The predetermined frictional engagement element includes: a plurality of friction plates arranged with clearances therebetween; a piston movable between a releasing position where the friction plates are brought into a released state, and an engaging position where the friction plates are brought into an engaged state by pressing the friction plates; and urging mechanism for urging the piston so that the piston abuts against the friction plates and the clearances are reduced.

According to the automatic transmission, in the frictional engagement element for achieving the starting gear ratio of forward or reverse driving of the vehicle, the piston is moved by the urging force of the urging mechanism to a position where the clearances of the friction plates are reduced. Therefore, the problem of deformation of the piston due to the hydraulic pressure does not arise, and the positional accuracy of the piston can be made satisfactory. Thus, in the automatic transmission which does not use the hydraulic power transmission device, the increase in the engine resistance along with the decrease in the positional accuracy of the piston can be suppressed.

In the automatic transmission, it is desired that the urging mechanism is formed of a compression coil spring, and is arranged on a surface of the piston which is opposite to a surface opposed to the friction plates.

According to the automatic transmission, advantages are attained in that the urging force can be generated by the stretching force of the compression coil spring and the configuration of the device can be simplified.

It is desired that: the automatic transmission further include: an engaging hydraulic pressure chamber configured to move the piston in a direction toward the engaging position; and a hydraulic pressure control section configured to control a hydraulic pressure to be supplied to the engaging hydraulic pressure chamber; and when the vehicle is stopped, the hydraulic pressure control section bring the engaging hydraulic pressure chamber into a state in which a hydraulic pressure lower than an engaging hydraulic pressure for producing the engaged state is supplied thereto.

According to the automatic transmission, when the vehicle is stopped, the clearances are reduced by the urging force of the urging mechanism. That is, the friction plates are brought into a state close to engagement. By supplying a predetermined engaging hydraulic pressure to the engaging hydraulic pressure chamber afterwards, the friction plates can promptly be brought into the engaged state.

In this case, it is desired that: the starting gear ratio be achieved by the predetermined frictional engagement element and another frictional engagement element; and when the vehicle is stopped, the hydraulic pressure control section bring the other frictional engagement element into a state in which the engaging hydraulic pressure is supplied thereto.

According to the automatic transmission, when the vehicle is stopped, the other frictional engagement element is brought into the engaged state. There is produced a state in which the starting gear ratio is achieved by switching the predetermined frictional engagement element to the engaged state lastly. Thus, the response to achieve the starting gear ratio from the stopped state can be increased.

In the automatic transmission, it is desired that, when the vehicle is started from a stopped state, the hydraulic pressure control section cause the engaging hydraulic pressure to be supplied to the engaging hydraulic pressure chamber.

According to the automatic transmission, the friction plates can promptly be brought into the engaged state by supplying the engaging hydraulic pressure to the engaging hydraulic pressure chamber.

In the automatic transmission, it is desired that: the gear shifting mechanism be a stepped gear shifting mechanism ranging from a first gear position at which the starting gear ratio is achieved to an N-th gear position at which a top speed gear ratio is achieved; the predetermined frictional engagement element be continuously brought into the engaged state from the first gear position to an (N–A)th gear position; and the other frictional engagement element be brought into the engaged state from the first gear position to an (N–B)th gear position (provided that B>A).

According to the automatic transmission, the predetermined frictional engagement element is a frictional engagement element having the highest versatility when the vehicle is suddenly decelerated and then accelerated again, for example. By applying the frictional engagement element excellent in the response as described above to such a frictional engagement element, the driving performance can be increased.

It is desired that: the automatic transmission further include: a releasing hydraulic pressure chamber configured to move the piston in a direction toward the releasing position; and a hydraulic pressure control section configured to control a hydraulic pressure to be supplied to the releasing hydraulic pressure chamber; and when the piston is moved toward the releasing position, the hydraulic pressure control section cause a hydraulic pressure at least greater than an urging force of the urging mechanism to be supplied to the releasing hydraulic pressure chamber.

According to the automatic transmission, the piston can promptly be returned toward the releasing position against the urging force of the urging mechanism by the hydraulic pressure supplied to the releasing hydraulic pressure chamber.

According to the present invention as described above, it is possible to provide the automatic transmission in which the power of the drive source is applied to the input section without intervention of the hydraulic power transmission device, and in which the frictional engagement elements can be engaged with a quick response without increasing the engine resistance.

This application is based upon Japanese Patent Application No. 2016-32042, filed with the JPO on Feb. 23, 2016, the contents of which are incorporated herein by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An automatic transmission for a vehicle, comprising: an input section to which power generated by a drive source is input; an output section configured to output a drive force; and a gear shifting mechanism configured to change a gear ratio between the input section and the output section, the power being input to the input section without intervention of a hydrodynamic power transmission device, the gear shifting mechanism including a predetermined frictional engagement element for achieving a starting gear ratio of the vehicle, and the predetermined frictional engagement element including: a plurality of friction plates arranged with clearances therebetween; a piston movable between a releasing position where the friction plates are brought into a released state, and an engaging position where the friction plates are brought into an engaged state by pressing the friction plates; and a first spring and a second spring configured to directly contact and urge the piston toward the engaging position, then the second spring separating from the piston prior to the first spring engaging the friction plates.

2. The automatic transmission according to claim 1, wherein
the urging mechanism is formed of a compression coil spring, and is arranged on a surface of the piston which is opposite to a surface opposed to the friction plates.

3. The automatic transmission according to claim 2, further comprising:
an engaging hydraulic pressure chamber configured to move the piston in a direction toward the engaging position; and
a hydraulic pressure control section configured to control a hydraulic pressure to be supplied to the engaging hydraulic pressure chamber, wherein
when the vehicle is stopped, the hydraulic pressure control section brings the engaging hydraulic pressure chamber into a state in which a hydraulic pressure lower than an engaging hydraulic pressure for producing the engaged state is supplied thereto.

4. The automatic transmission according to claim 3, wherein:
the starting gear ratio is achieved by the predetermined frictional engagement element and another frictional engagement element; and
when the vehicle is stopped, the hydraulic pressure control section brings the other frictional engagement element into a state in which the engaging hydraulic pressure is supplied thereto.

5. The automatic transmission according to claim 4, wherein
when the vehicle is started from a stopped state, the hydraulic pressure control section causes the engaging hydraulic pressure to be supplied to the engaging hydraulic pressure chamber.

6. The automatic transmission according to claim 5, wherein:
the gear shifting mechanism is a stepped gear shifting mechanism ranging from a first gear position at which the starting gear ratio is achieved to an N-th gear position at which a top speed gear ratio is achieved;
the predetermined frictional engagement element is continuously brought into the engaged state from the first gear position to an (N–A)th gear position; and
the other frictional engagement element is brought into the engaged state from the first gear position to an (N–B)th gear position (provided that B>A).

7. The automatic transmission according to claim 6, further comprising:
a releasing hydraulic pressure chamber configured to move the piston in a direction toward the releasing position; wherein
the hydraulic pressure control section configured to control a hydraulic pressure to be supplied to the releasing hydraulic pressure chamber, and
when the piston is moved toward the releasing position, the hydraulic pressure control section causes a hydraulic pressure at least greater than an urging force of the urging mechanism to be supplied to the releasing hydraulic pressure chamber.

8. The automatic transmission according to claim 2, further comprising:
a releasing hydraulic pressure chamber configured to move the piston in a direction toward the releasing position; and
a hydraulic pressure control section configured to control a hydraulic pressure to be supplied to the releasing hydraulic pressure chamber, wherein
when the piston is moved toward the releasing position, the hydraulic pressure control section causes a hydraulic pressure at least greater than an urging force of the urging mechanism to be supplied to the releasing hydraulic pressure chamber.

9. The automatic transmission according to claim 3, wherein
when the vehicle is started from a stopped state, the hydraulic pressure control section causes the engaging hydraulic pressure to be supplied to the engaging hydraulic pressure chamber.

10. The automatic transmission according to claim 9, wherein:
the gear shifting mechanism is a stepped gear shifting mechanism ranging from a first gear position at which the starting gear ratio is achieved to an N-th gear position at which a top speed gear ratio is achieved;
the predetermined frictional engagement element is continuously brought into the engaged state from the first gear position to an (N−A)th gear position; and
another frictional engagement element is brought into the engaged state from the first gear position to an (N−B)th gear position (provided that B>A).

11. The automatic transmission according to claim 10, further comprising:
a releasing hydraulic pressure chamber configured to move the piston in a direction toward the releasing position; wherein
the hydraulic pressure control section configured to control a hydraulic pressure to be supplied to the releasing hydraulic pressure chamber, and
when the piston is moved toward the releasing position, the hydraulic pressure control section causes a hydraulic pressure at least greater than an urging force of the urging mechanism to be supplied to the releasing hydraulic pressure chamber.

12. The automatic transmission according to claim 4, wherein:
the gear shifting mechanism is a stepped gear shifting mechanism ranging from a first gear position at which the starting gear ratio is achieved to an N-th gear position at which a top speed gear ratio is achieved;
the predetermined frictional engagement element is continuously brought into the engaged state from the first gear position to an (N−A)th gear position; and
the other frictional engagement element is brought into the engaged state from the first gear position to an (N−B)th gear position (provided that B>A).

13. The automatic transmission according to claim 12, further comprising:
a releasing hydraulic pressure chamber configured to move the piston in a direction toward the releasing position;
the hydraulic pressure control section configured to control a hydraulic pressure to be supplied to the releasing hydraulic pressure chamber, and
when the piston is moved toward the releasing position, the hydraulic pressure control section causes a hydraulic pressure at least greater than an urging force of the urging mechanism to be supplied to the releasing hydraulic pressure chamber.

14. The automatic transmission according to claim 1, further comprising:
an engaging hydraulic pressure chamber configured to move the piston in a direction toward the engaging position; and
a hydraulic pressure control section configured to control a hydraulic pressure to be supplied to the engaging hydraulic pressure chamber, wherein
when the vehicle is stopped, the hydraulic pressure control section brings the engaging hydraulic pressure chamber into a state in which a hydraulic pressure lower than an engaging hydraulic pressure for producing the engaged state is supplied thereto.

15. The automatic transmission according to claim 14, wherein:
the starting gear ratio is achieved by the predetermined frictional engagement element and another frictional engagement element; and
when the vehicle is stopped, the hydraulic pressure control section brings the other frictional engagement element into a state in which the engaging hydraulic pressure is supplied thereto.

16. The automatic transmission according to claim 15, wherein
when the vehicle is started from a stopped state, the hydraulic pressure control section causes the engaging hydraulic pressure to be supplied to the engaging hydraulic pressure chamber.

17. The automatic transmission according to claim 16, wherein:
the gear shifting mechanism is a stepped gear shifting mechanism ranging from a first gear position at which the starting gear ratio is achieved to an N-th gear position at which a top speed gear ratio is achieved;
the predetermined frictional engagement element is continuously brought into the engaged state from the first gear position to an (N−A)th gear position; and
the other frictional engagement element is brought into the engaged state from the first gear position to an (N−B)th gear position (provided that B>A).

18. The automatic transmission according to claim 17, further comprising:
a releasing hydraulic pressure chamber configured to move the piston in a direction toward the releasing position; wherein
the hydraulic pressure control section configured to control a hydraulic pressure to be supplied to the releasing hydraulic pressure chamber, and
when the piston is moved toward the releasing position, the hydraulic pressure control section causes a hydraulic pressure at least greater than an urging force of the urging mechanism to be supplied to the releasing hydraulic pressure chamber.

19. The automatic transmission according to claim 14, further comprising:
a releasing hydraulic pressure chamber configured to move the piston in a direction toward the releasing position; wherein
the hydraulic pressure control section configured to control a hydraulic pressure to be supplied to the releasing hydraulic pressure chamber, and
when the piston is moved toward the releasing position, the hydraulic pressure control section causes a hydraulic pressure at least greater than an urging force of the urging mechanism to be supplied to the releasing hydraulic pressure chamber.

20. The automatic transmission according to claim 1, further comprising:
a releasing hydraulic pressure chamber configured to move the piston in a direction toward the releasing position; and
a hydraulic pressure control section configured to control a hydraulic pressure to be supplied to the releasing hydraulic pressure chamber, wherein
when the piston is moved toward the releasing position, the hydraulic pressure control section causes a hydraulic pressure at least greater than an urging force of the urging mechanism to be supplied to the releasing hydraulic pressure chamber.

21. The automatic transmission according to claim 1, wherein
a working length of the first spring is larger than a working length of the second spring.

22. The automatic transmission according to claim 1, wherein
the second spring is arranged on a radially outer side of the first spring.

* * * * *